United States Patent
Mizutani et al.

(10) Patent No.: US 7,329,859 B2
(45) Date of Patent: Feb. 12, 2008

(54) PHOTOELECTRIC ENCODER

(75) Inventors: Miyako Mizutani, Kawasaki (JP); Tatsuya Nagahama, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 41 days.

(21) Appl. No.: 11/371,973

(22) Filed: Mar. 9, 2006

(65) Prior Publication Data
US 2006/0202113 A1 Sep. 14, 2006

(30) Foreign Application Priority Data
Mar. 11, 2005 (JP) .............................. 2005-069281

(51) Int. Cl.
*G01D 5/34* (2006.01)
*G01B 11/14* (2006.01)
(52) U.S. Cl. ................. 250/231.13; 356/617
(58) Field of Classification Search ........... 250/231.11, 250/231.13–213.18; 356/614–617
See application file for complete search history.

(56) References Cited

U.S. PATENT DOCUMENTS

| | | | | |
|---|---|---|---|---|
| 2,256,102 | A * | 9/1941 | Reason | 356/389 |
| 5,815,272 | A * | 9/1998 | Harding | 356/623 |
| 6,459,493 | B1 * | 10/2002 | Sugiura et al. | 356/630 |
| 6,567,126 | B1 * | 5/2003 | Slatter et al. | 348/345 |
| 2001/0022693 | A1 * | 9/2001 | Ishikawa | 359/642 |
| 2006/0027768 | A1 * | 2/2006 | Pearson et al. | 250/559.44 |

* cited by examiner

*Primary Examiner*—Georgia Epps
*Assistant Examiner*—Brian J Livedalen
(74) *Attorney, Agent, or Firm*—Rankin, Hill, Porter & Clark LLP

(57) ABSTRACT

A photoelectric encoder that has a lens optical system including a lens inserted between a main scale and a light receiving element. In the photoelectric encoder, three planes extended from a surface of the main scale, a principal plane of the lens, and an image plane of the light receiving element are disposed so as to intersect at a single point and satisfy the Scheimpflug rule. Focus can thereby be obtained over the entire image plane, so that a reduction in contrast is prevented, even if the optical axis is inclined to make an optical system smaller.

17 Claims, 10 Drawing Sheets

$M = \tan\theta_2 / \tan\theta_1 = 1$
$(\because \theta_1 = \theta_2)$ $M = \tan\theta_2 / \tan\theta_1 = 1$
($\because \theta_1 = \theta_2$)

$M = \tan\theta_2 / \tan\theta_1$ $M = \tan\theta_2 / \tan\theta_1$

PHOTOELECTRIC ENCODER

CROSS-REFERENCE TO RELATED APPLICATION

The disclosure of Japanese Patent Application No. 2005-69281 filed on Mar. 11, 2005 including specifications, drawings and claims is incorporated herein by reference in its entirety.

BACKGROUND OF THE INVENTION

1. Field of the Invention

The present invention relates to a photoelectric encoder. In particular, the invention relates to improvements in a photoelectric encoder that has a telecentric optical system wherein a lens and an aperture are inserted between a main scale and a light receiving element.

2. Description of the Related Art

As described in Japanese Patent Laid-Open Publication No. 2004-264295 and as shown in FIG. 1, a photoelectric encoder is designed in which a lens optical system (telecentric optical system) 40, comprising a lens 42 and an aperture 44 that functions as a telecentric optical diaphragm, is inserted between a main scale 20 and a light receiving element array 34 constituting a light receiving unit 30, for example, and as shown in FIG. 2 this lens optical system can set the magnification by adjusting the distances a and b between the lens 42 and the scale 21 of the main scale 20 and between the lens 42 and the light receiving element 35 on the light receiving element array 34, respectively. In FIG. 1, the reference numeral 10 denotes a light source and the reference symbol f denotes a focal length of the lens 42.

In the photoelectric encoder that uses this telecentric optical system 40, an image on the main scale 20 is made pass through the lens optical system (42, 44) and is projected onto the light receiving element array 34. Here, by positioning the aperture 44 at the focal position of the lens 42, even when the distance (gap) between the main scale 20 and the lens 42 changes, fluctuations in the magnification of the image formed on the light receiving element array 34 can be controlled if the positional relationship between the lens 42, the aperture 44, and the light receiving element array 34 does not change.

In Japanese Patent Laid-Open Publication No. Hei 10-82611, it is described that, utilizing the Scheimpflug rule, light is incident on a wafer from a lateral narrow slit provided in a reticle projection optical system.

When constituting a photoelectric encoder of a reflection type by using a telecentric optical system as described in Japanese Patent Laid-Open Publication No. 2004-264295, however, if a half mirror 46, at the center of which an aperture 44 is formed as shown in FIG. 3, is inserted, the amount of the light that passes through the half mirror 46 twice and reaches a light receiving element 34 is reduced by $(½)×(½)=(¼)$. Therefore, to offset this reduction, supply current to a light source 10 needs to be increased fourfold. In addition, since the optical axis is perpendicular to the surface plane of the main scale 20, it is impossible to make the optical system smaller. In FIG. 3, the reference numeral 12 denotes a collimator lens that collimates the light emitted from the light source 10.

When the optical axis is inclined as shown in FIG. 4, the air gaps between the main scale 20 and the lens 42 at the central and edge regions differ from each other as shown in FIG. 5. Therefore, if focus is obtained at the center, for example, blurring occurs at the upper and lower regions, so that a uniform contrast cannot be ensured over the entire light receiving surface, causing the problem of a reduction in signal detection efficiency.

Until now, the feasibility of applying the Scheimpflug rule to a photoelectric encoder using a telecentric optical system has not been considered.

SUMMARY OF THE INVENTION

In view of the foregoing problems, various embodiments of this invention provide a photoelectric encoder that prevents a reduction in contrast by obtaining focus over the entire image plane even if the optical axis is inclined to make an optical system smaller.

The present invention achieves the object by providing a photoelectric encoder that has a lens optical system including a lens inserted between a main scale and a light receiving element, and wherein three planes extended from a surface of the main scale, a principal plane of the lens, and an image plane of the light receiving element are disposed so as to intersect at a single point and satisfy the Scheimpflug rule.

In the photoelectric encoder, angles formed between the surface of the main scale and the principal plane of the lens and between the principal plane of the lens and the image plane of the light receiving element may be equal to each other.

The lens optical system may be a telecentric optical system including a lens and an aperture arranged at the focal position of the lens.

The invention further provides a photoelectric encoder that has a lens inserted between a main scale and a light receiving element, and wherein: at least a second lens is inserted between the first lens and the light receiving element so that a focal point thereof is located at a focal point of the first lens; and three planes extended from a surface of the main scale, a focal plane which includes the focal points of the first and second lens and being perpendicular to an optical axis, and an image plane of the light receiving element are disposed so as to intersect at a single point and satisfy the Scheimpflug rule, thereby enabling a magnification to be adjustable as well.

In the photoelectric encoder, angles formed between the surface of the main scale and the aperture plane and between the aperture plane and the image plane of the light receiving element may be equal to each other.

The lens system may be a birateral telecentric optical system.

According to the present invention, as shown in FIG. 6, the Scheimpflug rule, which ensures that if the three planes extended from the subject plane, a principal plane of a lens, and the image plane intersect at a single point, focus is obtained over the entire image plane, is satisfied, thereby obtaining focus over the entire image plane. Accordingly, even if the optical axis is inclined to make an optical system smaller, a reduction in contrast can be prevented.

The magnifications at the points A' and B' in FIG. 6 differ from each other, so the subject is imaged with distortion. If a lens optical system, wherein the first and second lens are combined with focal points coincide with each other, is employed, however, the magnifications can be adjusted to prevent the subject from being distorted.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Embodiments of the present invention will now be described in detail with reference to the attached drawings.

Figure 1:
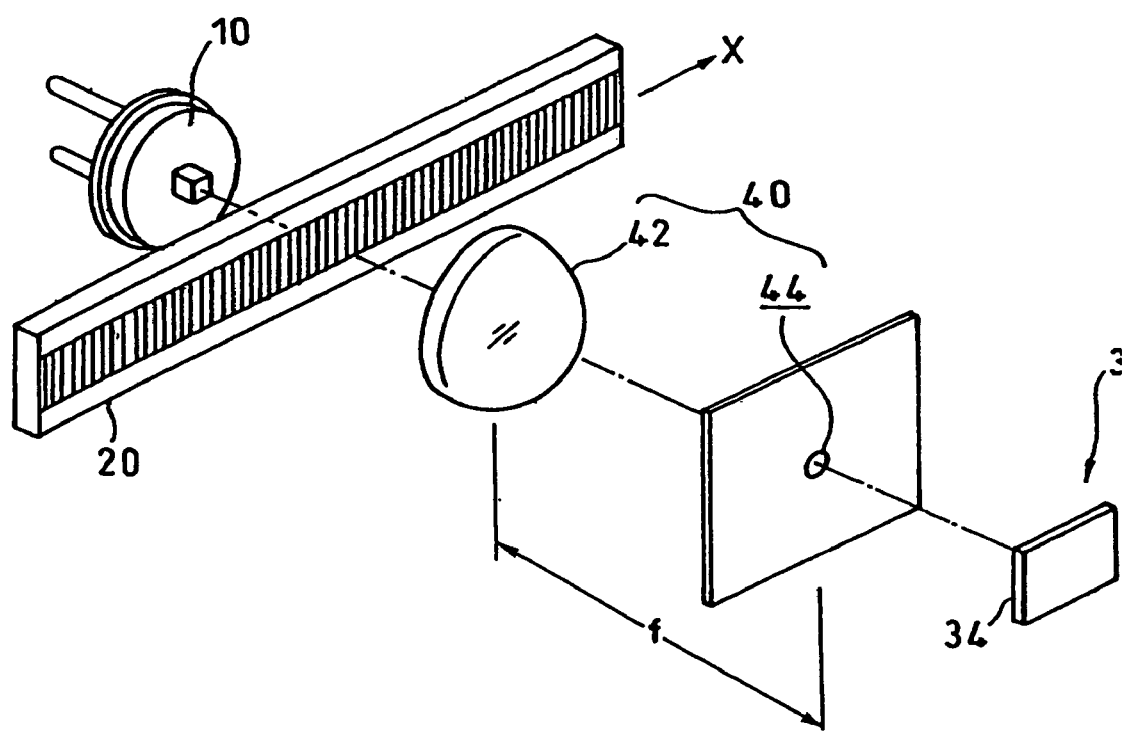
FIG. 1 is a perspective view showing the essential parts of a photoelectric encoder using a telecentric optical system.
Figure 2:
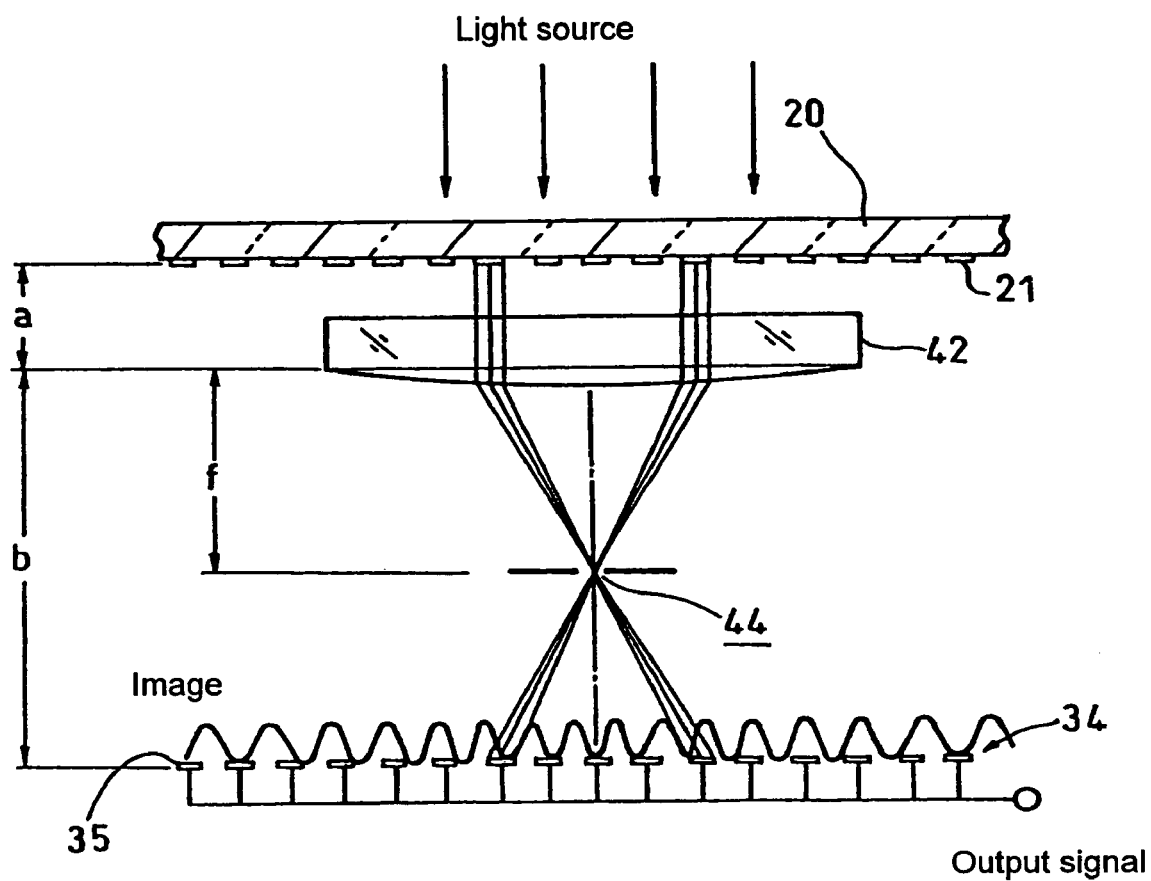
FIG. 2 is a plan view of FIG. 1.
Figure 3:
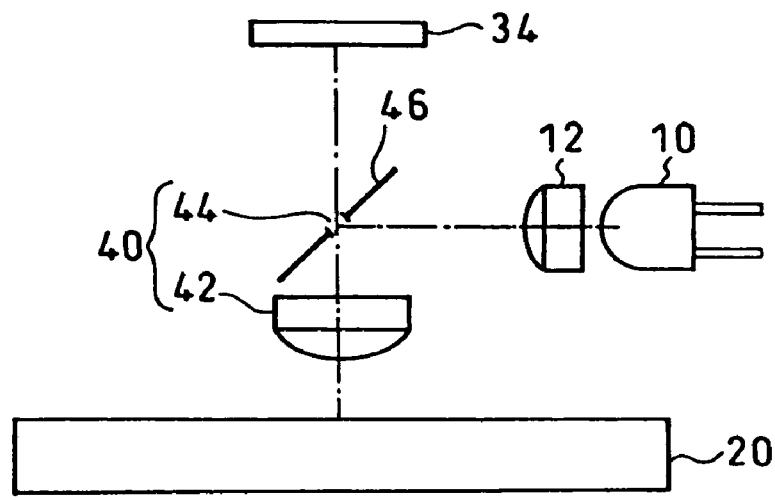
FIG. 3 is a light path view of a conventional technology using a half mirror.
Figure 4:
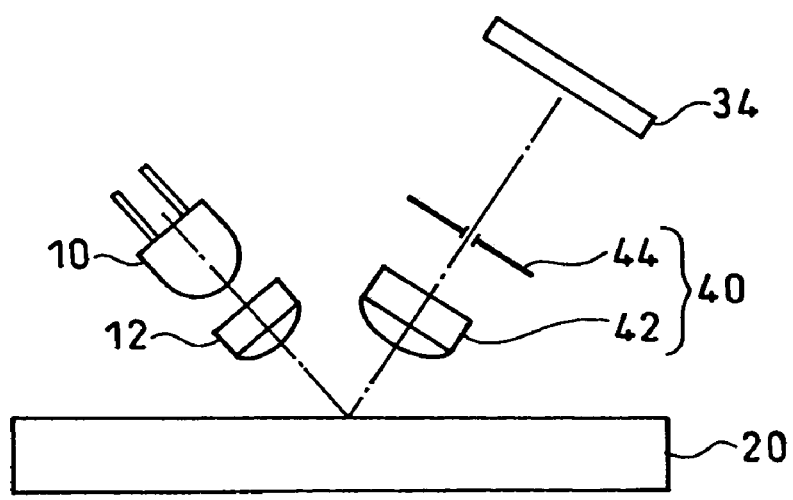
FIG. 4 is a light path view of a conventional technology with an inclined optical axis.
Figure 5:
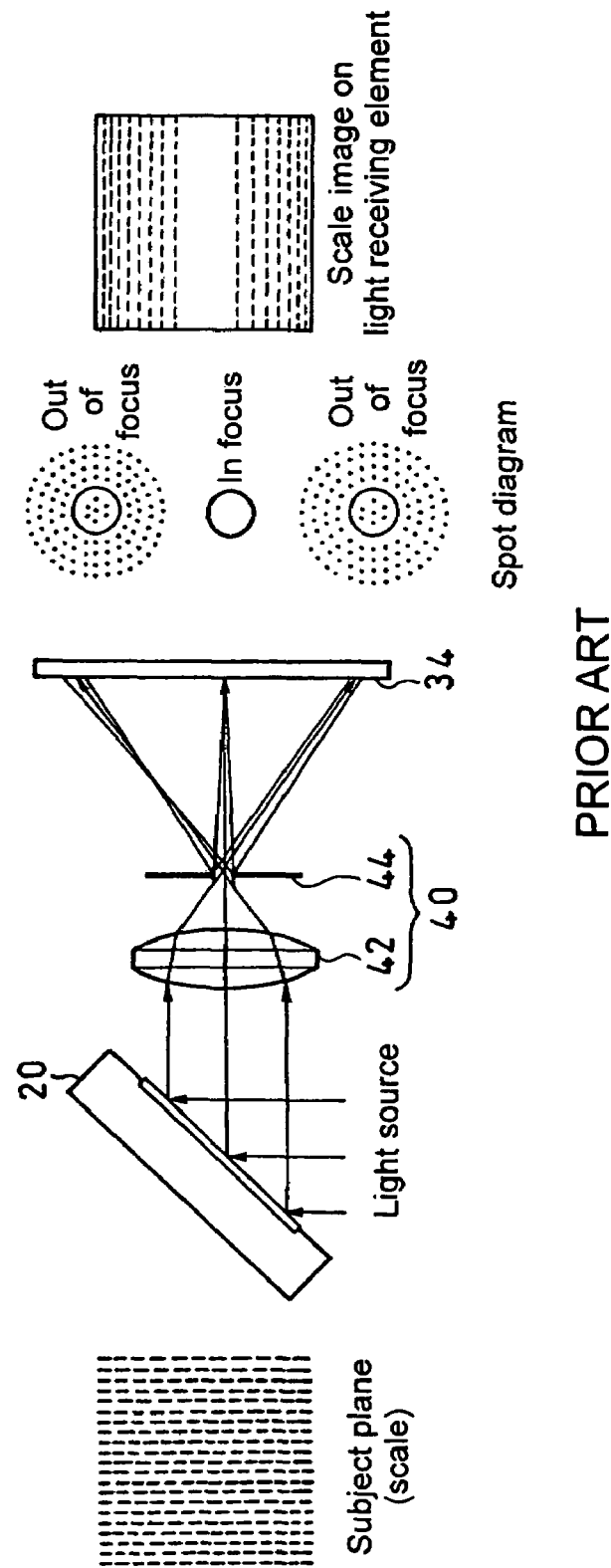
FIG. 5 is a diagram illustrating a problem in FIG. 4.
Figure 6:
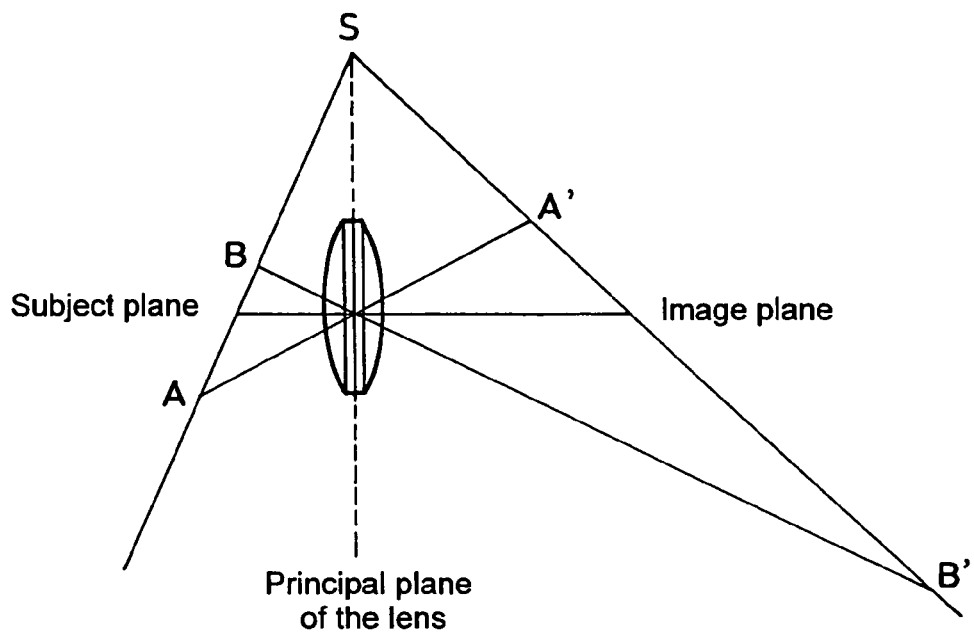
FIG. 6 is a diagram illustrating the principle of the present invention.
Figure 7:
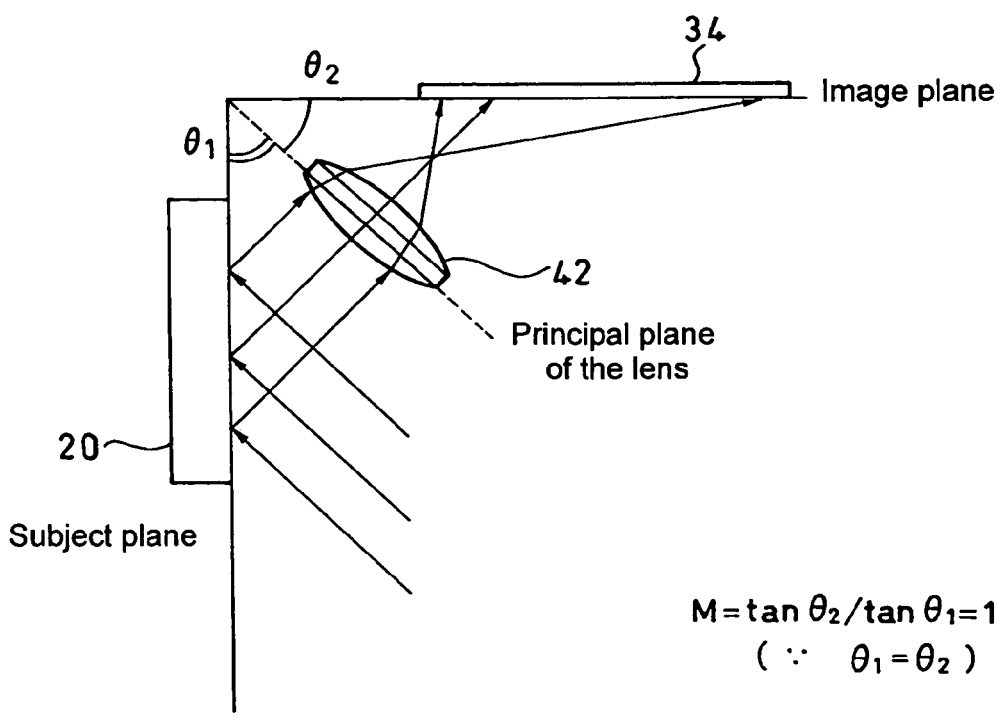
FIG. 7 is a light path view illustrating the essential parts of a first embodiment of the present invention.

A first embodiment of the invention includes, as shown in FIG. 7, a scale 20, a lens 42, and a light receiving element 34, which are disposed so that a subject plane of the scale 20, a principal plane of the lens 42, and an image plane of the light receiving element 34 satisfy the Scheimpflug rule and an angle $\theta_1$ between the subject plane and the principal plane of the lens and an angle $\theta_2$ between the principal plane of the lens and the image plane match each other.

In the present embodiment, since $\theta_1=\theta_2$, the optical magnification of an image is given by $$M = \tan\theta_2 / \tan\theta_1 = 1$$

implying an optical system with 1× magnification.

In particular, when $\theta_1=\theta_2=45°$, the sum $\theta_1+\theta_2$ comes to 90°, so that assembly becomes easy.

Figure 8:
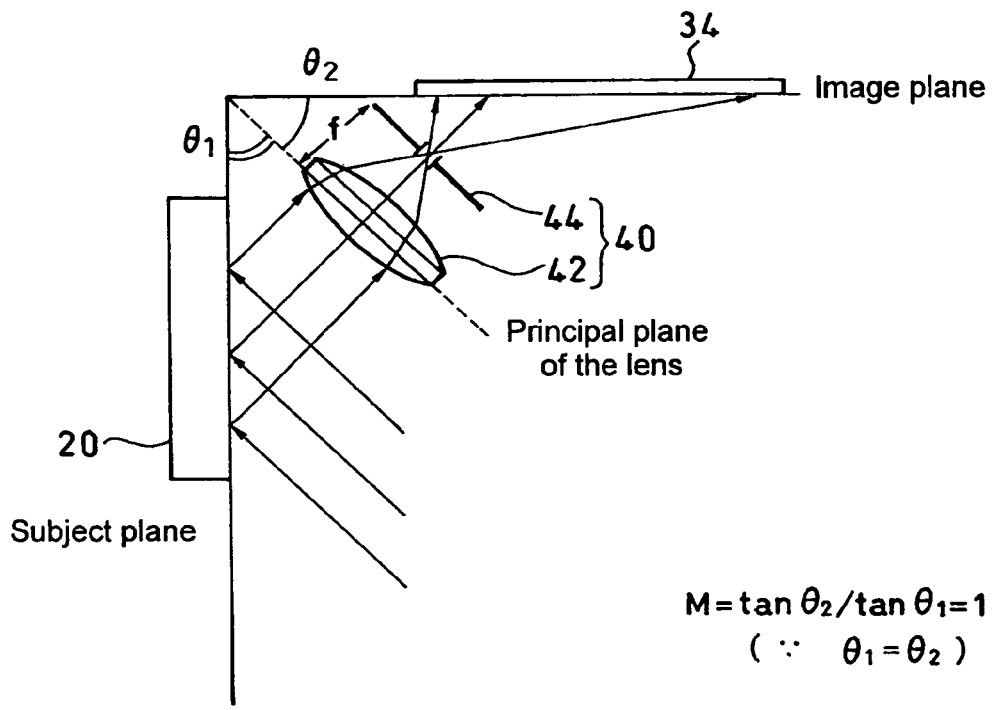
FIG. 8 is a modification of the first embodiment.

Further, as a modification shown in FIG. 8, an aperture 44 may be inserted at a focal point of the lens 42 to constitute a telecentric optical system 40.

Figure 9:
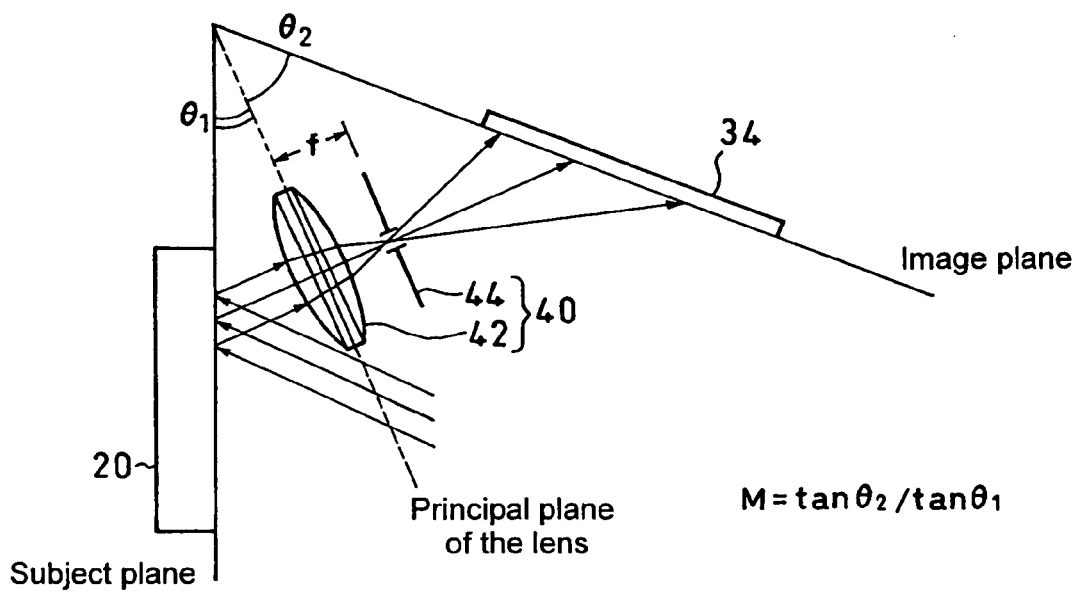
FIG. 9 is a light path view illustrating the essential parts of a second embodiment of the present invention.

As in a second embodiment shown in FIG. 9, it is also possible to constitute an optical system with M× magnification by setting as $\theta_1 \neq \theta_2$.

Next, a third embodiment of the present invention will be described in detail with reference to FIG. 10.

The present embodiment relates to a photoelectric encoder that has a lens optical system 50 configured such that a second lens 48, which is the same as the lens 42 (referred to also as "first lens"), is inserted on the opposite side of the first lens 42 in a reverse fashion so that its focal point is located at focal point of the first lens 42. In this photoelectric encoder, the scale 20, the lens optical system 50, and the light receiving element 34 are disposed so that the subject plane, a plane (referred to as "focal plane") which includes the focal points of the first lens 42 and the second lens 48 and being perpendicular to optical axis, and the image plane satisfy the Scheimpflug rule and the angle $\theta_1$ between the subject plane and the focal plane and the angle $\theta_2$ between the focal plane and the image plane match each other.

In the present embodiment, since the first lens 42 on the input side and the second lens 48 on the output side are identical to each other, an aberration occurring at the first lens 42 can be nearly completely compensated and canceled out by the second lens 48, thereby significantly improving the signal detection efficiency.

Further, since the second lens 48 is inserted so that its focal point is located at the focal point of the first lens 42, the light exiting the second lens 48 is collimated, so that the trapezium distortion (magnification) is compensated in comparison with the first embodiment.

In particular, when $\theta_1=\theta_2=45°$, the sum $\theta_1+\theta_2$ comes to 90°, so that assembly becomes easy.

Figure 11:
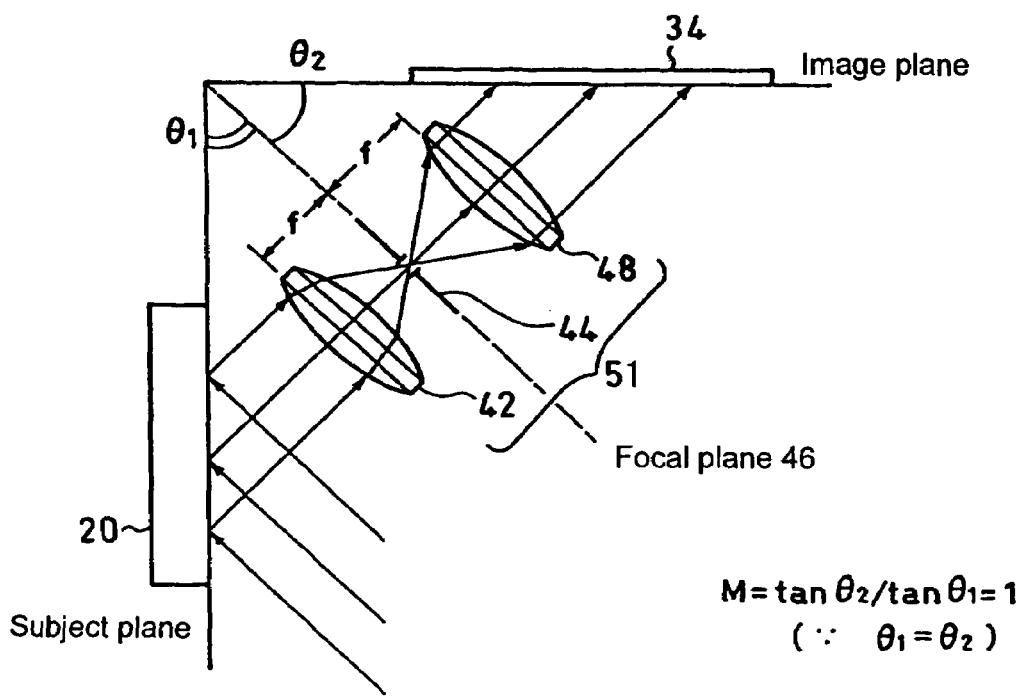
FIG. 11 is a modification of the third embodiment.

Further, as a modification shown in FIG. 11, the lens optical system 50 may be a bilateral telecentric optical system 51 wherein an aperture 44 is inserted at the focal point of the first lens 42 and the second lens 48.

Figure 12:
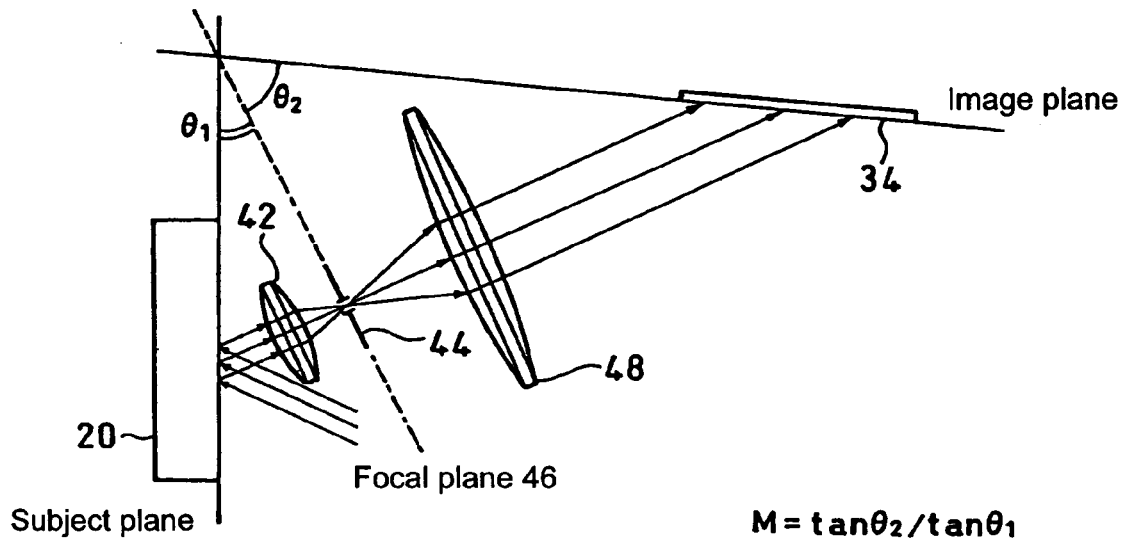
FIG. 12 is a light path view illustrating the essential parts of a fourth embodiment of the present invention.

As in a fourth embodiment shown in FIG. 12, it is also possible to constitute an optical system with M× magnification by setting as $\theta_1 \neq \theta_2$. In this case, since the input lens 42 and the output lens 48 are different from each other, there is a risk that the aberration could not be completely canceled, but assembly tolerance in the gap direction can be extended.

Figure 13:
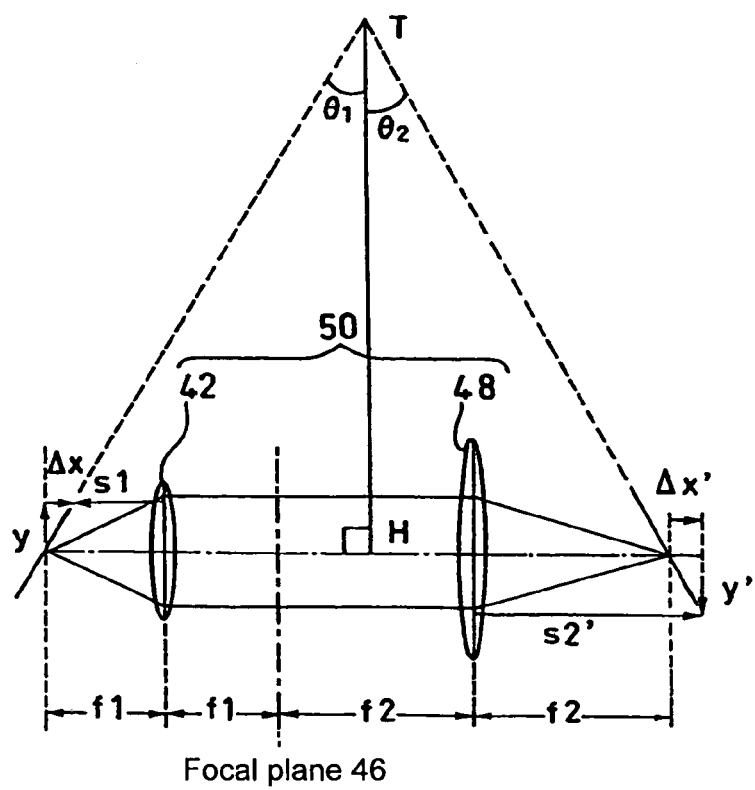
FIG. 13 is a light path diagram illustrating how to apply the Scheimpflug principle to a bilateral telecentric optical system.

The reason will now be described why the focal plane, which includes focal points of two lenses and being perpendicular to optical axis, is used as a principle plane of the lens system in the lens optical system, wherein two lenses are combined with focal points of both lenses coincide with each other, when the Scheimpflug principle is applied. In a typical lens optical system 50 in which the input and output lenses 42 and 48 have respective focal lengths $f_1$ and $f_2$ as shown in FIG. 13, the position $s_2'$ where focus is obtained when the subject is inclined will be considered.

(i) When $s_1 = -f_1$ (on the optical axis)

$$s_2' = f_2$$

(ii) When $s_1 \neq -f_1$ (off the optical axis) Since $$(1/s_1') = (1/s_1) + (1/f_1)$$

then $$s_1' = s_1 f_1 / (s_1 + f_1).$$

Therefore, the object position for the output lens 48 is given by the following equation:

$$s_2 = -(f_1 + f_2 - s_1') = -(s_1 f_2 + f_1^2 + f_1 f_2)/(s_1 + f_1).$$

Accordingly, since $(1/s_2') = (1/s_2) + (1/f_2)$, $s_2'$ is described by the following equation.

$$s_2' = \{f_2(s_1 f_2 + f_1^2 + f_1 f_2)\}/f_1^2$$
$$= (f_2^2/f_1^2) \cdot s_1 + f_2 + (f_2^2/f_1^2) \cdot f_1$$

Therefore, $$s_2' - f_2 = (f_2^2/f_1^2)(s_1 + f_1).$$

Referring to FIG. 13, the following relationship is obtained.

$$\Delta x' = (f_2^2/f_1^2) \cdot \Delta x \quad (1)$$

If the heights of the object and the image are denoted y and y', respectively, their relationship is given by the following equation.

$$y' = \beta y = -(f_2/f_1) \cdot y$$

If the substitution $y = \theta_1 \Delta x$ is made in the above equation, then the following equation is obtained from equation (1).

$$\begin{aligned} y' = \beta y &= -(f_2/f_1) \cdot y \\ &= -(f_2/f_1) \cdot \theta_1 \Delta x \\ &= -(f_2/f_1) \cdot \theta_1 \cdot (f_1^2/f_2^2) \cdot \Delta x' \\ &= -\theta_1 \cdot (f_1/f_2) \cdot \Delta x' \end{aligned}$$

Accordingly, when the subject plane is inclined by an angle of $\theta_1$, if the image plane is inclined by an angle of $\theta_1 \cdot (f_1/f_2)$, focus is obtained over the entire plane. This implies that the intersection of the planes extended from the subject plane and the image plane lies on the focal plane 46.

In all above embodiments, the light receiving element 34 must be assembled so as to be inclined with respect to the scale 20, so careful assembly is required. Therefore, a fifth embodiment of the invention, capable of arranging the scale 20 and the light receiving element 34 in parallel with each other, will be described in detail with reference to FIG. 14.

Figure 10:
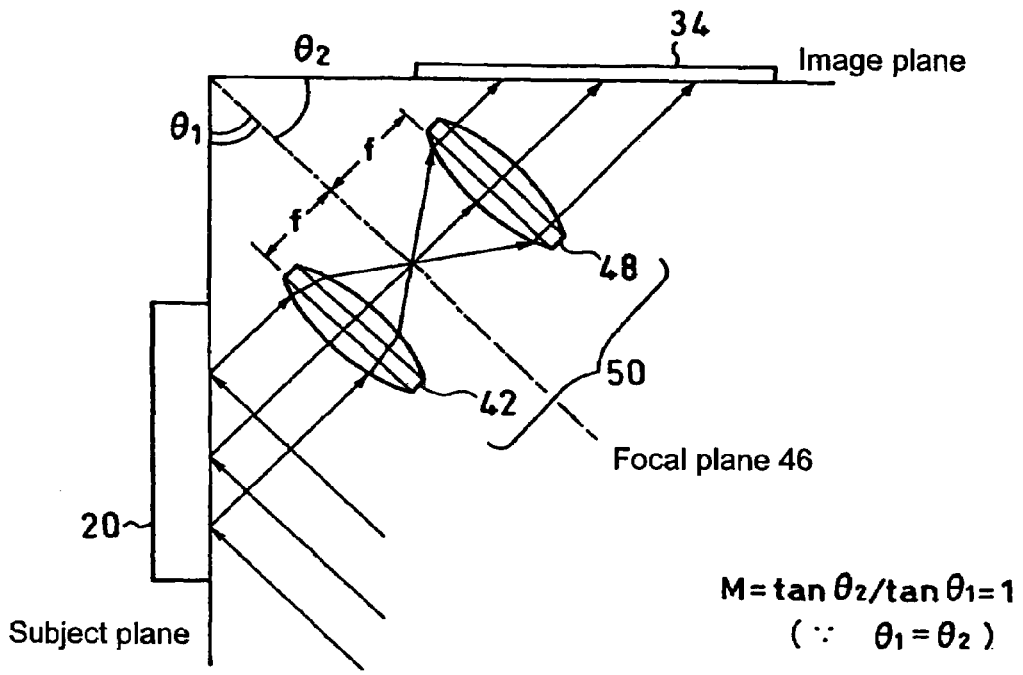
FIG. 10 is a light path view illustrating the essential parts of a third embodiment of the present invention.
Figure 14:
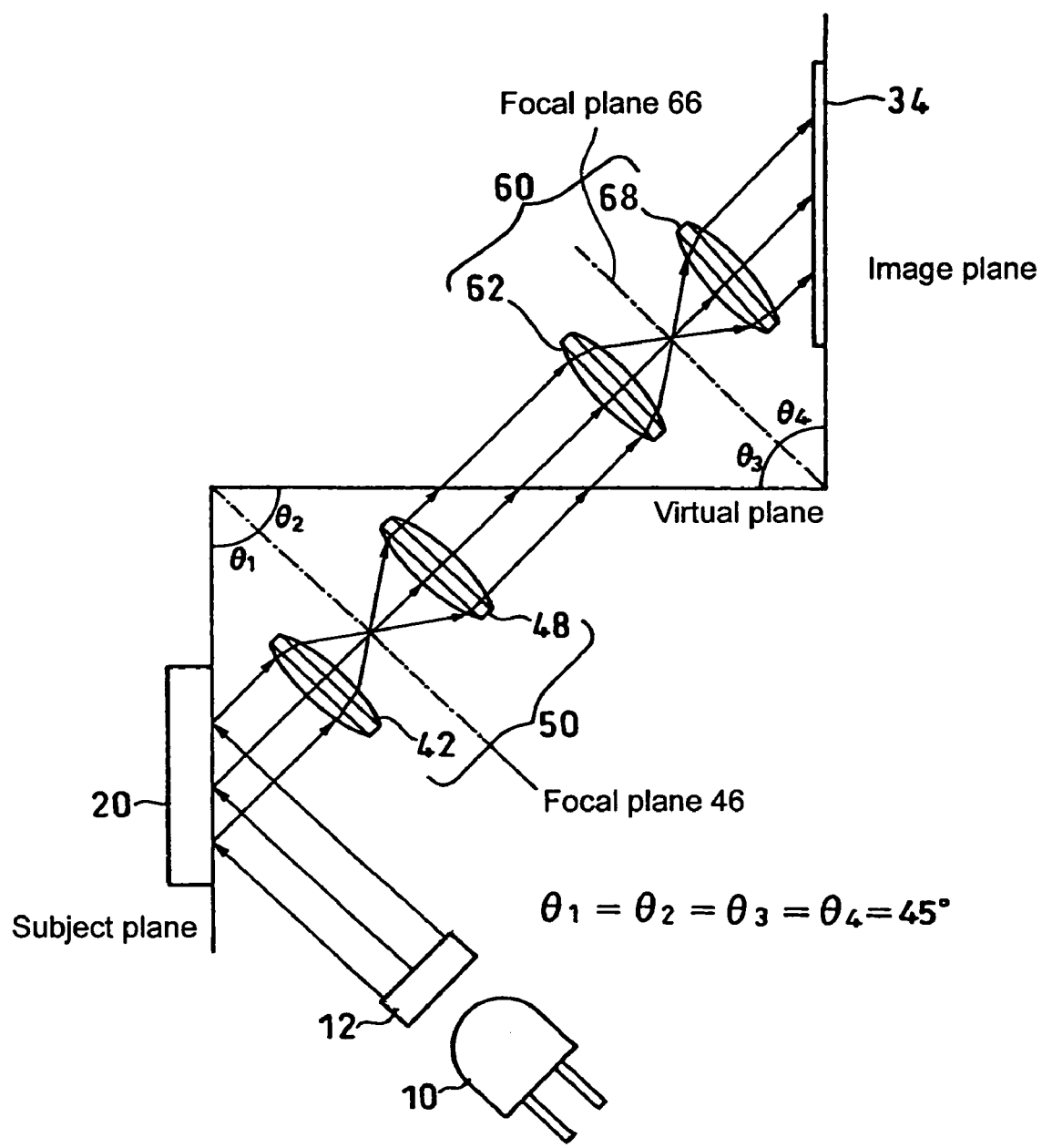
FIG. 14 is a light path view illustrating the essential parts of a fifth embodiment of the present invention.

The present embodiment relates to the photoelectric encoder similar to the third embodiment as shown in FIG. 10. In this embodiment, as shown in FIG. 14, a second lens optical system 60 is also disposed on the side of the light receiving element 34 in addition to the lens optical system 50 (referred to also as "first lens optical system") on the side of the main scale 20. The second lens optical system 60 includes third and fourth lenses 62 and 68. In this photoelectric encoder, two sets of three planes are disposed so as to each satisfy the Scheimpflug rule, wherein: one set includes the surface of the main scale 20, the focal plane 46 of the first lens optical system 50, and the plane where the light receiving element 34 was present in the third embodiment (referred to as "virtual plane"); and the other includes the virtual plane, the focal plane 66 of the second lens optical system 60, and the image plane of the light receiving element 34.

In the present embodiment, especially when $\theta_1 = \theta_2 = \theta_3 = \theta_4 = 45°$, the scale 20 and the light receiving element 34 can be arranged in parallel with each other, so that not only assembly becomes easy, but it is easy to ensure the installation space for the light source 10 because the scale 20 and the light receiving element 34 are apart from each other.

Figure 15:
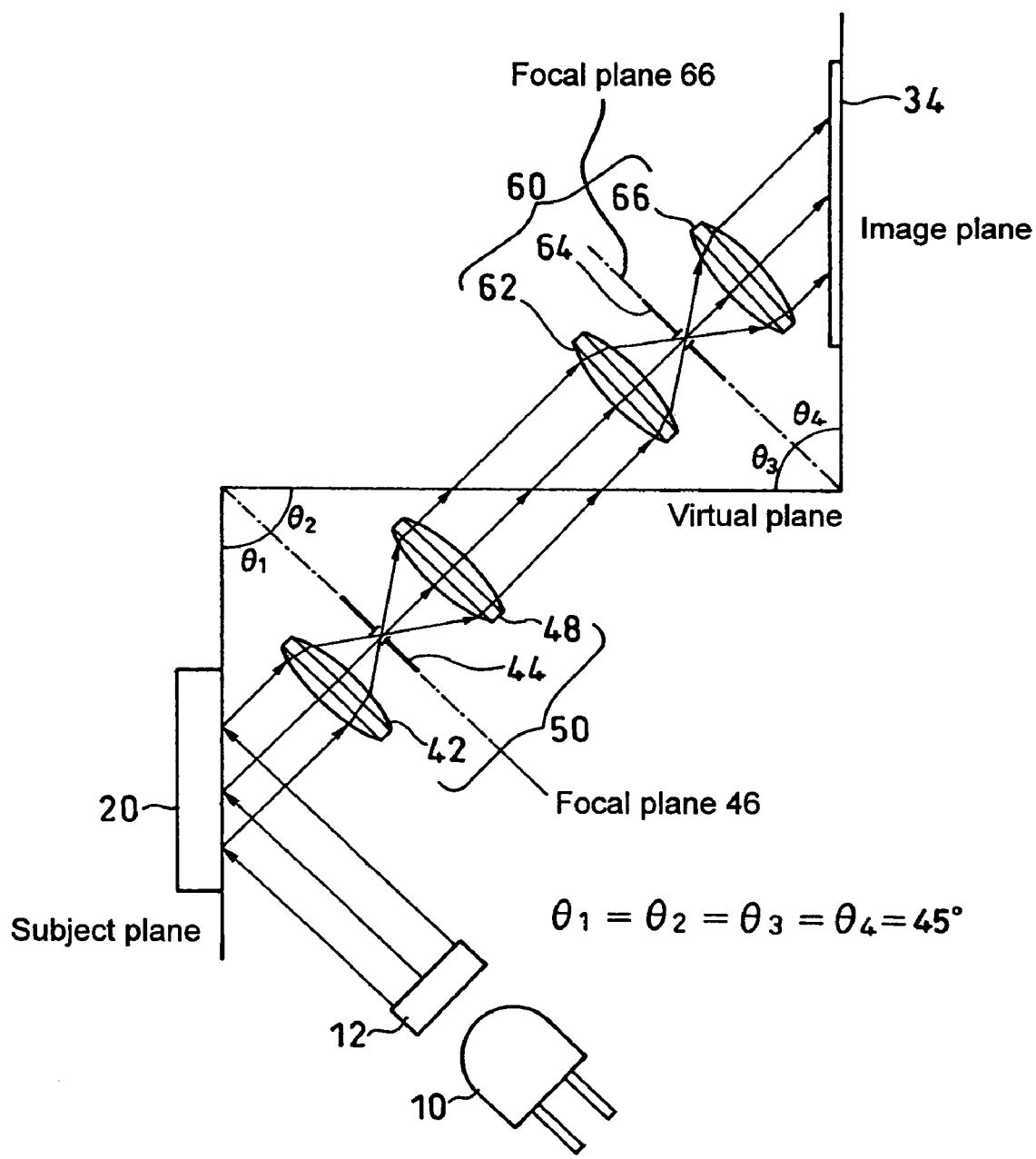
FIG. 15 is a modification of the fifth embodiment.

Further, as a modification shown in FIG. 15, an aperture 44 may be inserted at intersection of optical axis and the focal plane 46 and an aperture 64 may be inserted at intersection of optical axis and the focal plane 66 so as to make bilateral telecentric optical systems 51 and 61.

Incidentally, since the numerical aperture NA is determined by the first aperture 44, it is possible to omit the second aperture 64.

A planoconvex lens and a biconvex lens, which are highly accurate but expensive may be used as the lenses 42, 48, 62, and 68. Further, a spherical ball lens, a refractive index distribution type of cylindrical GRIN lens (also called as "SELFOC lens"), which refracts light rays parabolically within the lens material; and a drum lens may be used, too. These lenses have a large distortion and aberration but is cheep. However, aberrations occurring due to these lenses can be canceled out by using the same lenses in pairs.

The invention can be applied to a photoelectric encoder either having an index grating and a light receiving element separated from each other or a light receiving element array in which they are integrated with each other.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A photoelectric encoder having a lens optical system including a lens inserted between a main scale and a light receiving element, and
   wherein three planes extended from a surface of the main scale of the photoelectric encoder, a principal plane of the lens, and an image plane of the light receiving element are disposed so as to intersect at a single point and satisfy the Scheimpflug rule,
   wherein the lens optical system is a telecentric optical system including a lens and an aperture arranged at focal position of the lens, wherein a plane extending from a surface of the aperture is parallel to the principal plane of the lens.

2. The photoelectric encoder according to claim 1, wherein angles formed between the surface of the main scale and the principal plane of the lens and between the principal plane of the lens and the image plane of the light receiving element are equal to each other.

3. The photoelectric encoder according to claim 2, wherein
   the angles formed between the surface of the main scale and the principal plane of the lens and between the principal plane of the lens and the image plane of the light receiving element are 45°.

4. A photoelectric encoder having a lens optical system including a first lens inserted between a main scale and a light receiving element, and
   wherein:
   at least a second lens is inserted between the first lens and the light receiving element so that a focal point thereof is located at a focal point of the first lens; and
   three planes extended from a surface of the main scale of the photoelectric encoder, a focal plane which includes the focal points of the first and second lenses and being perpendicular to optical axis, and an image plane of the light receiving element are disposed so as to intersect at a single point and satisfy the Scheimpflug rule,
   wherein the first and second lenses comprise a telecentric optical system.

5. The photoelectric encoder according to claim 4, wherein
   angles formed between the surface of the main scale and the focal plane and between the focal plane and the image plane of the light receiving element are equal to each other.

6. The photoelectric encoder according to claim 5, wherein the angles formed between the surface of the main scale and the focal plane and between the focal plane and the image plane of the light receiving element are 45°.

7. A photoelectric encoder having a plurality of lens optical systems inserted between a main scale and a light receiving element, and wherein each of the lens optical systems on the side of the main scale of the photoelectric encoder and on the side of the light receiving element is configured so as to satisfy the Scheimpflug rule, wherein the plurality of lenses comprise a telecentric optical system.

8. The photoelectric encoder according to claim 7, wherein the surface of the main scale and the image plane of the light receiving element are parallel to each other.

9. The photoelectric encoder according to claim 4, wherein the lens optical system is a bilateral telecentric optical system.

10. The photoelectric encoder according to claim 4, wherein the lens optical system comprises a pair of the same ball lenses, GRIN lenses, or drum lenses.

11. The photoelectric encoder according to claim 5, wherein the lens optical system is a bilateral telecentric optical system.

12. The photoelectric encoder according to claim 6, wherein the lens optical system is a bilateral telecentric optical system.

13. The photoelectric encoder according to claim 7, wherein the lens optical system is a bilateral telecentric optical system.

14. The photoelectric encoder according to claim 8, wherein the lens optical system is a bilateral telecentric optical system.

15. The photoelectric encoder according to claim 5, wherein the lens optical system comprises a pair of the same ball lenses, GRIN lenses, or drum lenses.

16. The photoelectric encoder according to claim 6, wherein the lens optical system comprises a pair of the same ball lenses, GRIN lenses, or drum lenses.

17. The photoelectric encoder according to claim 7, wherein the lens optical system comprises a pair of the same ball lenses, GRIN lenses, or drum lenses.

* * * * *